United States Patent
Yi et al.

(10) Patent No.: US 10,652,922 B2
(45) Date of Patent: May 12, 2020

(54) METHOD FOR PROCESSING AN UPLINK GRANT AFTER THE LAST UPLINK TRANSMISSION IN WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/070,165

(22) PCT Filed: Jan. 25, 2017

(86) PCT No.: PCT/KR2017/000882
§ 371 (c)(1),
(2) Date: Jul. 13, 2018

(87) PCT Pub. No.: WO2017/131435
PCT Pub. Date: Aug. 3, 2017

(65) Prior Publication Data
US 2019/0021109 A1    Jan. 17, 2019

Related U.S. Application Data

(60) Provisional application No. 62/289,109, filed on Jan. 29, 2016.

(51) Int. Cl.
*H04W 72/14*   (2009.01)
*H04W 28/02*   (2009.01)
(Continued)

(52) U.S. Cl.
CPC ............ *H04W 72/14* (2013.01); *H04L 1/1812* (2013.01); *H04W 28/0278* (2013.01);
(Continued)

(58) Field of Classification Search
CPC ...... H04W 72/14; H04W 76/30; H04W 76/27; H04W 74/0833; H04W 28/0278; H04W 80/08; H04W 80/02; H04L 1/1812
See application file for complete search history.

(56) References Cited

U.S. PATENT DOCUMENTS 8,995,462 B2    3/2015 Kim et al.
9,178,664 B2 *  11/2015 Earnshaw ............ H04L 1/1822
(Continued)

FOREIGN PATENT DOCUMENTS

| EP | 2427010 | 3/2012 |
|---|---|---|
| WO | 2014180500 | 11/2014 |
| WO | 2016010217 | 1/2016 |

OTHER PUBLICATIONS

PCT International Application No. PCT/KR2017/000882, Written Opinion of the International Searching Authority dated May 15, 2017, 8 pages.
(Continued)

*Primary Examiner* — Hoang-Chuong Q Vu
(74) *Attorney, Agent, or Firm* — Lee Hong Degerman Kang & Waimey

(57) ABSTRACT

The present invention relates to a wireless communication system. More specifically, the present invention relates to a method and a device for processing an uplink grant after the last uplink transmission in wireless communication system, the method comprising: transmitting uplink data with a buffer status reporting (BSR); receiving uplink grant after the BSR is transmitted; and discarding the received uplink
(Continued)

grant if the received uplink grant is for new transmission and a buffer size of the BSR is set to zero.

6 Claims, 13 Drawing Sheets

(51) Int. Cl.
| | |
|---|---|
| *H04L 1/18* | (2006.01) |
| *H04W 76/27* | (2018.01) |
| *H04W 74/08* | (2009.01) |
| *H04W 72/12* | (2009.01) |
| *H04W 76/30* | (2018.01) |
| *H04W 80/02* | (2009.01) |
| *H04W 80/08* | (2009.01) |

(52) U.S. Cl.
CPC ... *H04W 72/1278* (2013.01); *H04W 74/0833* (2013.01); *H04W 76/27* (2018.02); *H04W 76/30* (2018.02); *H04W 80/02* (2013.01); *H04W 80/08* (2013.01)

(56) References Cited

U.S. PATENT DOCUMENTS

| | | | |
|---|---|---|---|
| 2010/0070814 A1* | 3/2010 | Damnjanovic | H04L 1/188 714/748 |
| 2010/0070816 A1 | 3/2010 | Park et al. | |
| 2010/0265906 A1 | 10/2010 | Bucknell et al. | |
| 2010/0322165 A1 | 12/2010 | Yoo | |
| 2011/0243014 A1 | 10/2011 | Lee et al. | |
| 2011/0255502 A1 | 10/2011 | Shen et al. | |
| 2013/0010625 A1 | 1/2013 | Schein | |
| 2013/0163537 A1 | 6/2013 | Anderson et al. | |
| 2013/0182653 A1 | 7/2013 | Earnshaw et al. | |
| 2013/0294337 A1 | 11/2013 | Damnjanovic et al. | |
| 2014/0247733 A1* | 9/2014 | Yang | H04W 36/14 370/252 |
| 2014/0247759 A1 | 9/2014 | Zhang et al. | |
| 2014/0334414 A1 | 11/2014 | Englund et al. | |
| 2015/0003371 A1 | 1/2015 | Park et al. | |
| 2015/0092541 A1 | 4/2015 | Yang et al. | |
| 2015/0282102 A1* | 10/2015 | Kakishima | H04W 52/40 370/329 |
| 2016/0080969 A1* | 3/2016 | Tseng | H04W 4/70 370/329 |
| 2017/0257876 A1* | 9/2017 | Loehr | H04L 5/0044 |
| 2017/0257883 A1 | 9/2017 | Bessho | |
| 2018/0270020 A1* | 9/2018 | Wikstrom | H04L 1/1607 |
| 2018/0332500 A1 | 11/2018 | Wiberg et al. | |
| 2018/0359775 A1* | 12/2018 | Yi | H04L 1/1812 |

OTHER PUBLICATIONS

PCT International Application No. PCT/KR2017/000874, Written Opinion of the International Searching Authority dated Apr. 25, 2017, 8 pages.

3rd Generation Partnership Project (3GPP), "Technical Specification Group Radio Access Network; Evolved Universal Terrestrial Radio Access (E-UTRA); Medium Access Control (MAC) protocol specification (Release 13)," 3GPP TS 36.321 V13.0.0, Dec. 2015, 82 pages.

Samsung, "DL/UL HARQ timing for low cost MTC UEs in enhanced coverage", 3GPP TSG RAN WG1 Meeting #83, R1-156740, Nov. 2015, 4 pages.

U.S. Appl. No. 16/072,350, Office Action dated Sep. 18, 2019, 6 pages.

European Patent Office Application Serial No. 17744552.5, Search Report dated Jun. 25, 2019, 8 pages.

European Patent Office Application Serial No. 17744556.6, Search Report dated Aug. 6, 2019, 8 pages.

Ericsson, "Corrections for Further EUL enhancements", 3GPP TSG-RAN WG2 Meeting #88, R2-144781, XP050899453, Nov. 2014, 15 pages.

LG Electronics, "Early use of DRX cycle for NB-IOT", 3GPP TSG-RAN WG2 NB-IOT, R2-160503, XP051066488, Jan. 2016, 3 pages.

LG Electronics, "NDI and Msg3", 3GPP TSG-RAN WG2 Meeting #62bis, R2-083723, XP050141043, Jul. 2008, 2 pages.

Nokia Siemens, "Padding BSR and Empty Transmission Buffers", 3GPP TSG-RAN WG2 Meeting #71bis, R2-105318, XP050452576, Oct. 2010, 4 pages.

* cited by examiner (a) Control-Plane Protocol Stack (b) User-Plane Protocol Stack

METHOD FOR PROCESSING AN UPLINK GRANT AFTER THE LAST UPLINK TRANSMISSION IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2017/000882, filed on Jan. 25, 2017, which claims the benefit of U.S. Provisional Application No. 62/289,109, filed on Jan. 29, 2016, the contents of which are all hereby incorporated by reference herein in their entirety.

TECHNICAL FIELD

The present invention relates to a wireless communication system and, more particularly, to a method for processing an uplink grant after the last uplink transmission in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for processing an uplink grant after the last uplink transmission in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

It is invented that when an UE receives an UL grant for a new transmission after the UE transmitted a buffer status reporting (BSR) including zero buffer size to an eNB, the UE ignores the received UL grant and does not perform a uplink transmission by using the received UL grant.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
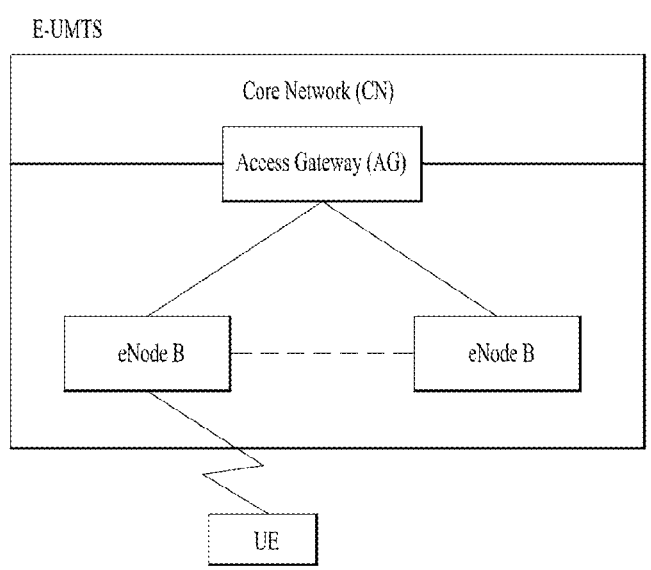
FIG. 1 is a diagram showing a network structure of an Evolved Universal Mobile Telecommunications System (E-UMTS) as an example of a wireless communication system.
Figure 2A:
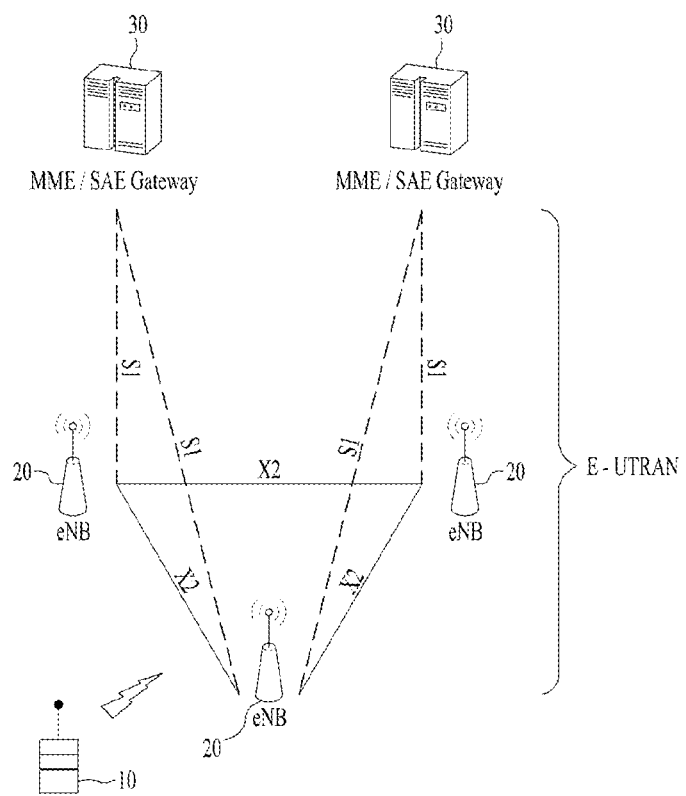
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
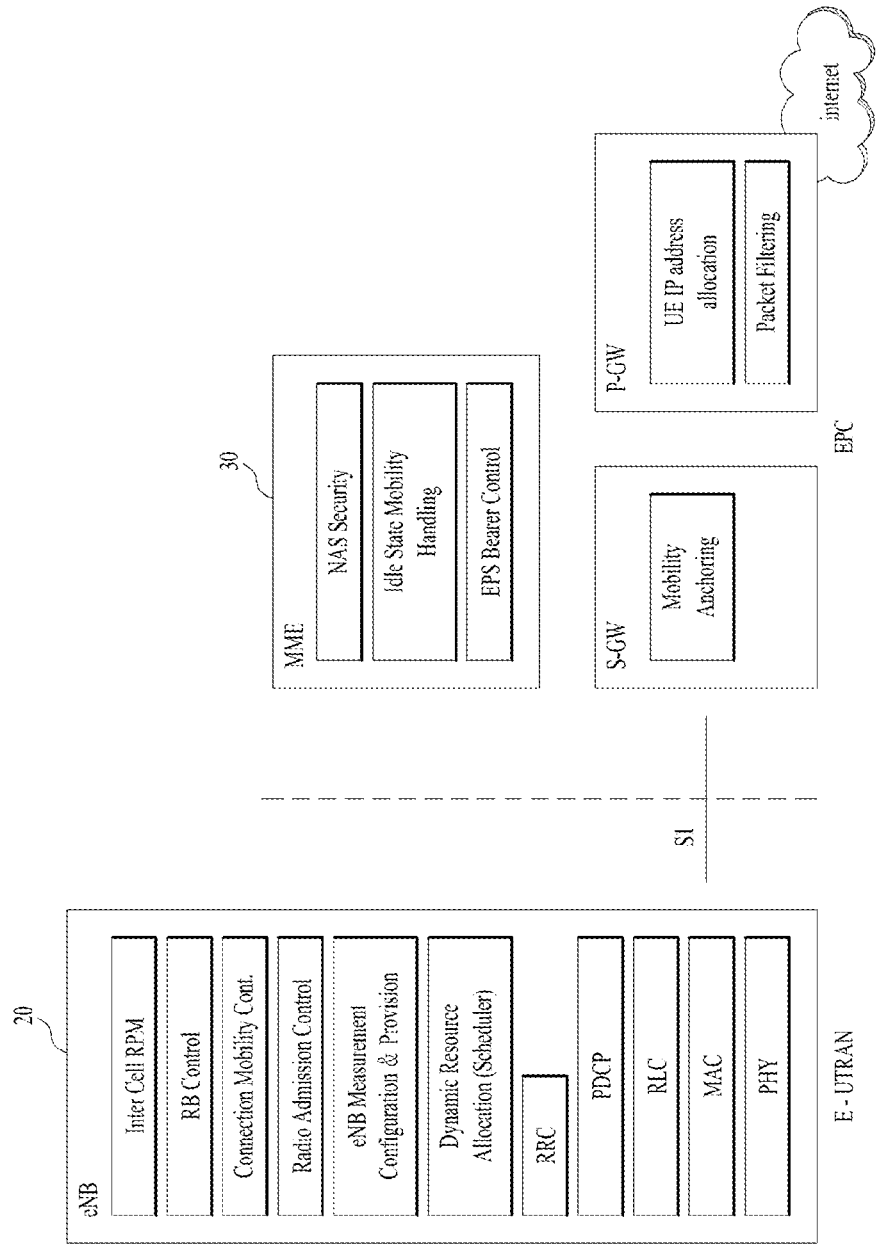
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
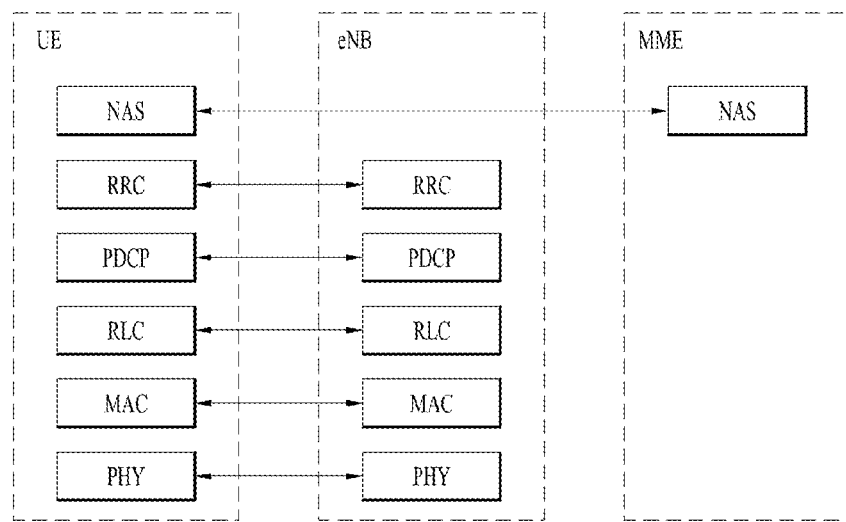
FIG. 3 is a diagram showing a control plane and a user plane of a radio interface protocol between a UE and an E-UTRAN based on a 3rd generation partnership project (3GPP) radio access network standard.
Figure 3:
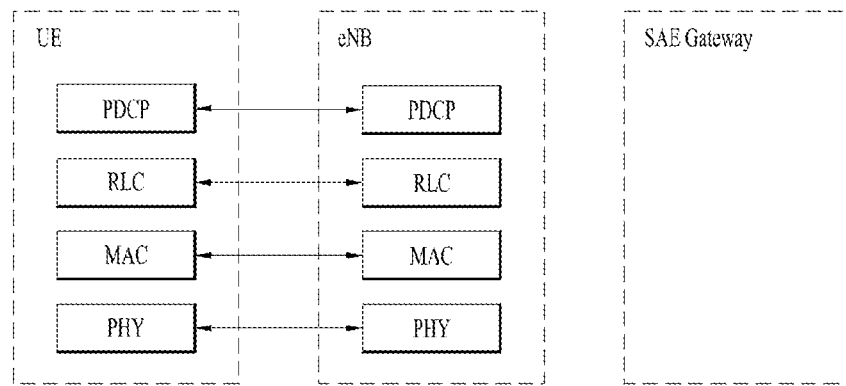

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
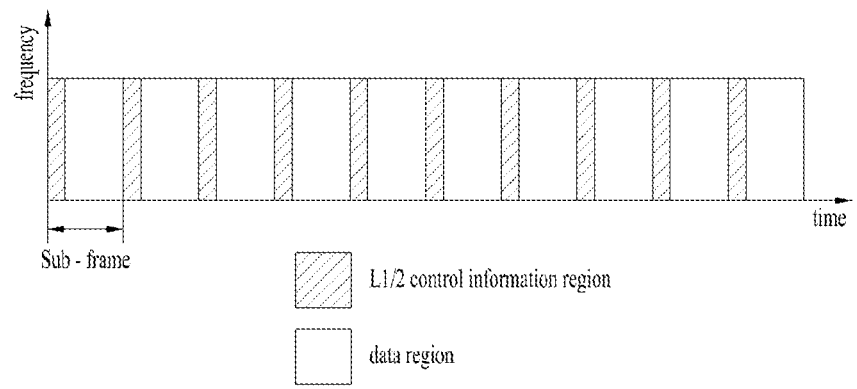
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
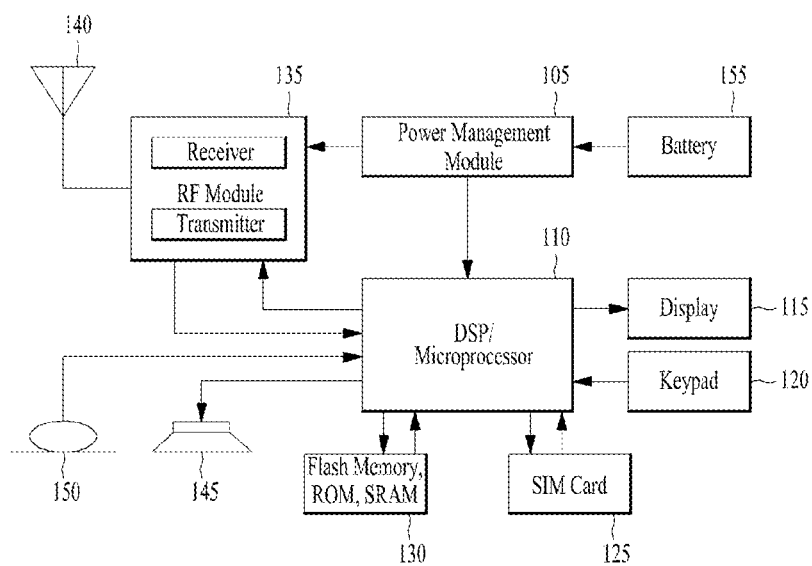
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver;

135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6A:
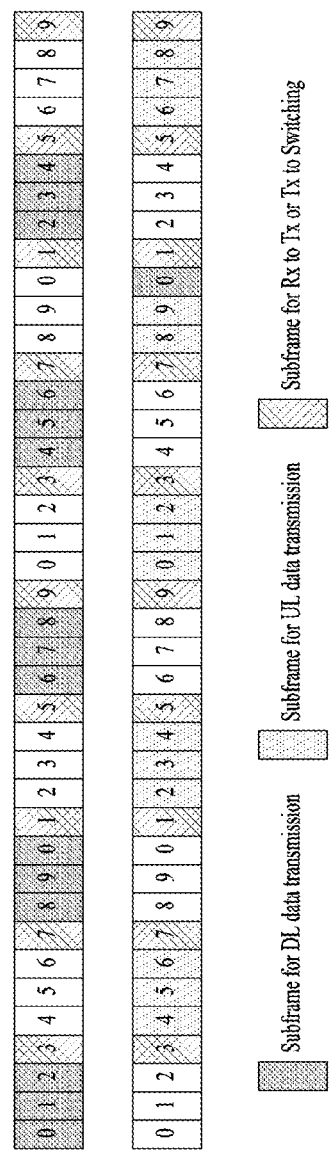
FIG. 6A is an example for data transmission and reception for a Category 0 low complexity UE.
Figure 6B:
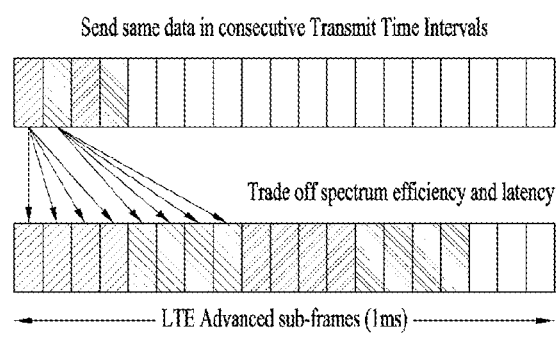
FIG. 6B is an example for repetitions for data transmission for a Category 0 low complexity UE.

FIG. 6A is an example for data transmission and reception for a Category 0 low complexity UE, and FIG. 6B is an example for repetitions for data transmission for a Category 0 low complexity UE.

Such a communication technology as MTC is specialized from 3GPP to transmit and receive IoT-based information and the MTC has a difference according to each release of the technology. Release 10 and Release 11 are focusing on a method of controlling loads of IoT (M2M) products and a method of making the loads have least influence on a network when the IoT products make a request for accessing an eNB at the same time. Release 12 and Release 13 are focusing on a low-cost technology enabling a battery to be simply implemented and very little used by reducing complicated functions mounted on a legacy smartphone as many as possible.

Low complexity UEs are targeted to low-end (e.g. low average revenue per user, low data rate, delay tolerant) applications, e.g. some Machine-Type Communications.

A low complexity UE has reduced Tx and Rx capabilities compared to other UE of different categories.

In particular, a low complexity UE does not require such a function of high performance as a function of a smartphone and an amount of data used by the low complexity UE is not that big in general. Hence, there is no reason for a complicated and high-price communication module to come to the market for such a UE as the low complexity UE.

In order to manufacture a low-cost IoT (M2M) device, a concept such as UE Category 0 has been introduced. A UE category corresponds to a general figure used in 3GPP to indicate the amount of data capable of being processed by a UE in a communication modem. In general, as the amount of data to be processed is getting bigger, a price of a modem is also increasing due to a memory or performance enhancement. In case of a currently commercialized smartphone, performance of the smartphone is continuously increasing from 100 Mbps to 150 Mbps and 300 Mbps on the basis of download.

Table 1 shows UE categories used in 3GPP.

TABLE 1

| UE Category | Downlink (velocity) | Uplink (velocity) |
|---|---|---|
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 500 Mbps | 50 Mbps |
| 7 | 300 Mbps | 100 Mbps |
| 8 | 3 Gbps | 1.5 Gbp |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A Category 0 low complexity UE may access a cell only if SIB1 indicates that access of Category 0 UEs is supported. If the cell does not support access of Category 0 UEs, the UE considers the cell as barred.

The eNB determines that a UE is a Category 0 UE based on the LCID for CCCH and the UE capability.

The S1 signalling has been extended to include the UE Radio Capability for paging. This paging specific capability information is provided by the eNB to the MME, and the MME uses this information to indicate to the eNB that the paging request from the MME concerns a low complexity UE.

And, since it is able to perform transmission and reception on specific time only without performing transmission and reception at the same time like FIG. 6A, it may be able to perform an operation of TDD in FDD (since transmission and reception are not performed at the same time). Additionally, unlike legacy TDD, since it is able to provide sufficient switching time as much as 1 ms to a section at which switching is performed between transmission and reception, it is able to expect a revolutionary cost reduction effect in terms of overall hardware part especially a modem and an RF. On the contrary, according to a regulation of a legacy LTE UE, it is mandatory to use at least 2 or more reception antennas.

First, a bandwidth reduced low complexity (BL) UE can operate in any LTE system bandwidth but with a limited channel bandwidth of 6 PRBs (corresponding to the maximum channel bandwidth available in a 1.4 MHz LTE system) in downlink and uplink.

A BL UE may access a cell only if the MIB of the cell indicates that scheduling information for SIB1 specific for BL UEs is scheduled. If not, the UE considers the cell as barred.

A BL UE receives a separate occurrence of system information blocks (sent using different time/frequency resources). A BL UE has a transport block size (TBS) limited to 1000 bit for broadcast and unicast. The BL UE determines the scheduling information for SIB1 specific for BL UEs based on information in MIB. Scheduling information for other SIBs is given in SIB1 specific for BL UEs. The BCCH modification period for BL UEs is a multiple of the BCCH modification period provided in SIB2. The SIB transmission occasions within an SI-window are provided in the SIB1 specific for BL UEs. A BL UE can acquire SI messages across SI windows. The maximum number of SI messages that can be acquired across SI windows is 4. A BL UE is not required to detect SIB change when in RRC_CONNECTED.

A BL UE is paged based on paging occasions in time domain, and paging narrowbands in frequency domain. The starting subframe of a paging occasion is determined in the same way as the paging occasion in the legacy paging mechanism.

A set of PRACH resources (e.g. time, frequency, preamble), each associated with BL UEs in normal coverage, is provided in SIB. Number of PRACH repetitions and number of maximum preamble transmission attempts for BL UEs in normal coverage are provided in SIB. Time/frequency resources and repetition factor for random access response messages for BL UEs are derived from the used PRACH resources.

Next, a UE in enhanced coverage is a UE that requires the use of enhanced coverage functionality to access the cell. In this release of specification two enhanced coverage modes (mode A, mode B) are supported. The support of enhanced coverage mode A is mandatory for a BL UE.

A UE may access a cell using enhanced coverage functionality only if the MIB of the cell indicates that scheduling information for SIB1 specific for BL UEs is scheduled. System information procedures for UEs in enhanced coverage are identical to the system information procedures for bandwidth reduced low complexity UEs. A UE capable of enhanced coverage acquires, if needed, and uses legacy system information when in normal coverage if it is not a BL UE. A UE capable of enhanced coverage acquires, if needed, and uses system information specific for UEs in enhanced coverage. A UE in enhanced coverage is not required to detect SIB change when in RRC_CONNECTED.

A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs in same enhanced coverage level use random access resources associated with the same enhanced coverage level. Time/frequency resources and repetition factor for random access response messages for UEs in enhanced coverage are derived from the used PRACH resources.

A UE in enhanced coverage is paged using the same mechanism for paging BL UEs. The starting subframe of a paging occasion and the repetition pattern (in both time and frequency domain for downlink common control signaling) of that paging occasion are determined irrespective of the UEs enhanced coverage level.

The paging request from the MME for a UE supporting enhanced coverage functionality may contain enhanced coverage level related information and corresponding cell ID.

A UE in RRC_IDLE does not inform the network when it changes the enhanced coverage level.

A UE in enhanced coverage camps on a suitable cell where S criterion for UEs in enhanced coverage is fullfilled. The UE shall re-select to inter-frequency cells in which it is able to operate in normal coverage over cells in which it has to be in enhanced coverage.

Connected mode mobility mechanisms such as measurement reporting, network controlled handover etc., are supported for UEs in enhanced coverage. No additional mechanisms are introduced to support the use of enhanced coverage functionality to access an E-UTRA cell during inter-RAT handovers.

NB-IoT provides access to network services using physical layer optimized for very low power consumption (e.g. full carrier bandwidth is 180 kHz, subcarrier spacing can be 3.75 kHz or 15 kHz).

As indicated in the relevant subclauses in this specification, a number of E-UTRA protocol functions supported by all Rel-8 UEs are not used for NB-IoT and need not be supported by eNBs and UEs only using NB-IoT. For NB-IoT, the narrowband physical downlink control channel (NPDCCH) is located in available symbols of configured subframes. Within a PRB pair, two control channel elements are defined, with each control channel element composed of resources within a subframe. NPDCCH supports aggregations of 1 and 2 control channel elements and repetition. NPDCCH supports C-RNTI, Temporary C-RNTI, P-RNTI, and RA-RNTI.

The contention-based random access is supported for NB-IoT. Configuration of RACH parameters may be different per coverage level. RACH attempts/reattempts should follow the assumptions listed below: i) Multiple RACH attempts are supported, ii) RACH reattempts may be done on the same or different coverage level, iii) Triggering too many attempts needs to be avoided. There will be one or more thresholds that limit the number of attempts, MAX NUMBER OF ATTEMPTS or similar per coverage level, and iv) MAC indicates random access problem to the RRC layer, when MAC has exhausted all attempts for a RACH procedure.

RAN node can determine the UE's coverage level from the random access procedure. How this is done depends on the physical layer RACH design. The original eMTC design, e.g. by using S1 Context Release message to indicate coverage level, can be used as the baseline, at least for the UP solution. The CN may include coverage enhancement (CE) level information, Global Cell Id and Paging Attempt Count IE in the Paging message to indicate related information to the RAN node. In idle mode, UEs in general do not make specific access only to report coverage level change.

For NB-IoT, the RLC layer supports the following functions: i) Transfer of upper layer PDUs, ii) Concatenation, segmentation and reassembly of RLC SDUs. But the following RLC layer functions are assumed not supported: i) Reordering of RLC data PDUs (dependent on HARQ mechanism), ii) Duplicate detection (dependent on HARQ mechanism), and iii) the RLC UM is not supported.

The PDCP layer supports the following functions: i) PDCP SN size is 7 bits (or less), ii) Transfer of data (user plane or control plane), iii) Header compression and decompression of IP data flows using the ROHC protocol, iv) Ciphering and Integrity Protection, and v) Ciphering and deciphering. But the following PDCP layer functions are assumed not supported: i) In-sequence delivery of upper layer PDUs at PDCP re-establishment procedure for RLC AM (dependent on support of RRC reestablishment and RLC-AM), ii) Duplicate detection and duplicate discarding of lower layer SDUs at PDCP re-establishment procedure for RLC AM (dependent on support of RRC reestablishment and RLC-AM), iii) Duplicate detection and duplicate discarding of lower layer SDUs at PDCP re-establishment procedure for RLC AM (dependent on support of RRC reestablishment and RLC-AM, iv) For split bearers, routing and reordering, and v) PDCP status report.

Uplink HARQ operation is asynchronous for NB-IoT UEs, BL UEs or UEs in enhanced coverage except for the repetitions within a bundle.

In particular, discussion on a solution for a performance deterioration problem caused by decrease of output power is in progress by considering a scheme of performing repetitive transmission as shown in FIB. 6B or a TTI bundling technology previously used in VoLTE (Voice of LTE, LTE voice call service). Consequently, it might say that it is able to develop a communication module of low complexity through the low-cost IoT (M2M) technology explained in the Release 12 and the low-power IoT (M2M) technology to which the Release 13 is targeting.

Figure 7:
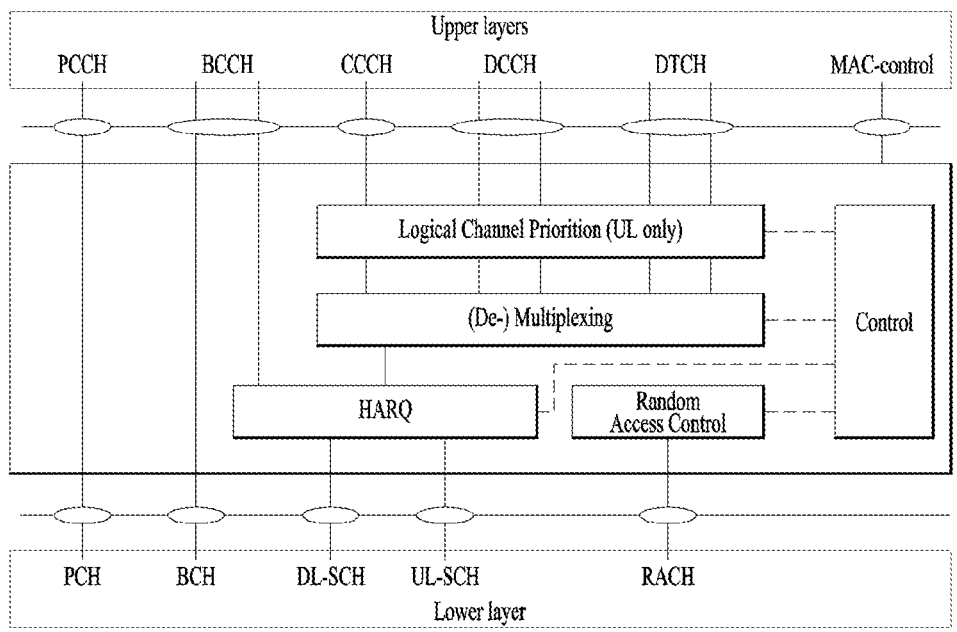
FIG. 7 is a diagram for MAC structure overview in a UE side.

FIG. 7 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical channel types specified for LTE includes Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), Multicast Traffic Channel (MTCH).

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

Figure 8:
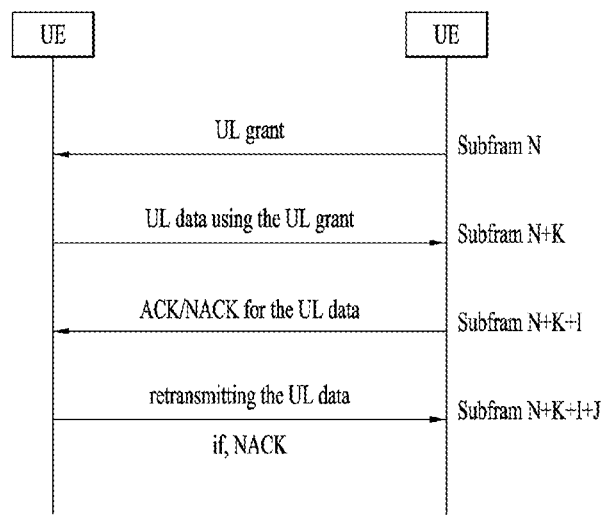
FIG. 8 is a conceptual diagram for uplink grant reception.

FIG. 8 is a conceptual diagram for uplink grant reception.

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

When the UE receives a valid uplink grant for transmitting uplink data and for a subframe N+K on a subframe N, the UE transmits the uplink data on a subframe N+K using the uplink grant. And then, the UE receives ACK/NACK feedback for transmission of the uplink data on a subframe N+K+I, and if the UE receives NACK indication, the UE should retransmits the UL data on a subframe N+K+I+J.

In detail, if the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI: if an uplink grant for this TTI and this Serving Cell has been received on the PDCCH for the MAC entity's C-RNTI or Temporary C-RNTI; or if an uplink grant for this TTI has been received in a Random Access Response, consider the NDI to have been toggled for the corresponding HARQ process regardless of the value of the NDI if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant, and deliver the uplink grant and the associated HARQ information to the HARQ entity for this TTI.

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

At a given TTI, if an uplink grant is indicated for the TTI, the HARQ entity identifies the HARQ processes for which a transmission should take place. It also routes the received HARQ feedback (ACK/NACK information), MCS and resource, relayed by the physical layer, to the appropriate HARQ processes.

For each TTI, the HARQ entity shall identify the HARQ process(es) associated with this TTI, and for each identified HARQ process, the MAC entity shall obtain the MAC PDU to transmit from the Msg3 buffer if there is a MAC PDU in the Msg3 buffer and the uplink grant was received in a Random Access Response, deliver the MAC PDU and the uplink grant and the HARQ information to the identified HARQ process, and instruct the identified HARQ process to trigger a new transmission, if the uplink grant was received on PDCCH.

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and max-HARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall set HARQ_FEEDBACK to the received value.

If the HARQ entity requests a new transmission, the HARQ process shall set CURRENT_TX_NB to 0, set CURRENT_IRV to 0, store the MAC PDU in the associated HARQ buffer, store the uplink grant received from the HARQ entity, set HARQ_FEEDBACK to NACK, and generate a transmission as described below.

If the HARQ entity requests a retransmission, the HARQ process shall increment CURRENT_TX_NB by 1. If the HARQ entity requests an adaptive retransmission, the HARQ process shall store the uplink grant received from the HARQ entity, set CURRENT_IRV to the index corresponding to the redundancy version value provided in the HARQ information, set HARQ_FEEDBACK to NACK, and generate a transmission as described below. Else if the HARQ entity requests a non-adaptive retransmission, if HARQ_FEEDBACK=NACK, the HARQ process shall generate a transmission as described below.

To generate a transmission, the HARQ process shall instruct the physical layer to generate a transmission according to the stored uplink grant with the redundancy version corresponding to the CURRENT_IRV value, and increment CURRENT_IRV by 1 if the MAC PDU was obtained from the Msg3 buffer; or if there is no measurement gap at the time of the transmission and, in case of retransmission, the retransmission does not collide with a transmission for a MAC PDU obtained from the Msg3 buffer in this TTI.

If there is a measurement gap at the time of the HARQ feedback reception for this transmission and if the MAC PDU was not obtained from the Msg3 buffer, the HARQ process shall set HARQ_FEEDBACK to ACK at the time of the HARQ feedback reception for this transmission.

After performing above actions, the HARQ process then shall flush the HARQ buffer if CURRENT_TX_NB=maximum number of transmissions-1.

Figure 9:
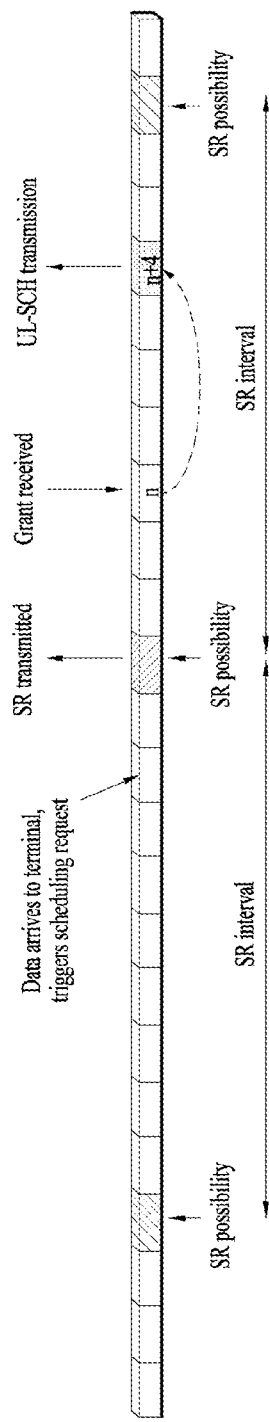
FIG. 9 is a diagram for Scheduling Request transmission.

FIG. 9 is a diagram for Scheduling Request transmission.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

A scheduling request is a simple flag, raised by the terminal to request uplink resources from the uplink scheduler. Since the terminal requesting resources by definition has no PUSCH resource, the scheduling request is transmitted on the PUCCH. Each terminal can be assigned a dedicated PUCCH scheduling request resource, occurring every nth subframe. With a dedicated scheduling-request mechanism, there is no need to provide the identity of the terminal requesting to be scheduled as the identity of the terminal is implicitly known from the resources upon which the request is transmitted.

When data with higher priority than already existing in the transmit buffers arrives at the terminal and the terminal has no grant and hence cannot transmit the data, the terminal transmits a scheduling request at the next possible instant, as illustrated in FIG. 15. Upon reception of the request, the scheduler can assign a grant to the terminal. If the terminal does not receive a scheduling grant until the next possible scheduling-request instant, then the scheduling request is repeated. There is only a single scheduling-request bit, irrespective of the number of uplink component carriers the terminal is capable of. In the case of carrier aggregation, the scheduling request is transmitted on the primary component carrier, in line with the general principle of PUCCH transmission on the primary component carrier only.

The use of a single bit for the scheduling request is motivated by the desire to keep the uplink overhead small, as a multi-bit scheduling request would come at a higher cost. A consequence of the single-bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below. Knowledge of the service type may also be used—for example, in the case of voice the uplink resource to grant is preferably the size of a typical voice-over-IP package. The scheduler may also exploit, for example, path-loss measurements used for mobility and handover decisions to estimate the amount of resources the terminal may efficiently utilize.

An alternative to a dedicated scheduling-request mechanism would be a contention-based design. In such a design, multiple terminals share a common resource and provide their identity as part of the request. This is similar to the design of the random access.

The number of bits transmitted from a terminal as part of a request would in this case be larger, with the correspondingly larger need for resources. In contrast, the resources are shared by multiple users. Basically, contention-based designs are suitable for a situation where there are a large number of terminals in the cell and the traffic intensity, and hence the scheduling intensity, is low. In situations with higher intensities, the collision rate between different terminals simultaneously requesting resources would be too high and lead to an inefficient design.

Although the scheduling-request design for LTE relies on dedicated resources, a terminal that has not been allocated such resources obviously cannot transmit a scheduling request. Instead, terminals without scheduling-request resources configured rely on the random-access mechanism. In principle, an LTE terminal can therefore be configured to rely on a contention-based mechanism if this is advantageous in a specific deployment.

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, if no UL-SCH resources are available for a transmission in this TTI, the UE may initiate a Random Access procedure on a PCell and cancel all pending SRs if the UE has no valid PUCCH resource for SR configured in any TTI.

Else if the UE has a valid PUCCH resource for SR configured for this TTI and if this TTI is not part of a measurement gap and if sr-ProhibitTimer is not running, if SR_COUNTER<dsr-TransMax, the UE may increment SR_COUNTER by 1, instruct the physical layer to signal the SR on PUCCH, and start the sr-ProhibitTimer.

if SR_COUNTER≥dsr-TransMax, the UE may notify RRC to release PUCCH/SRS for all serving cells, clear any configured downlink assignments and uplink grants, and initiate a Random Access procedure on the PCell and cancel all pending SRs.

Figure 10:
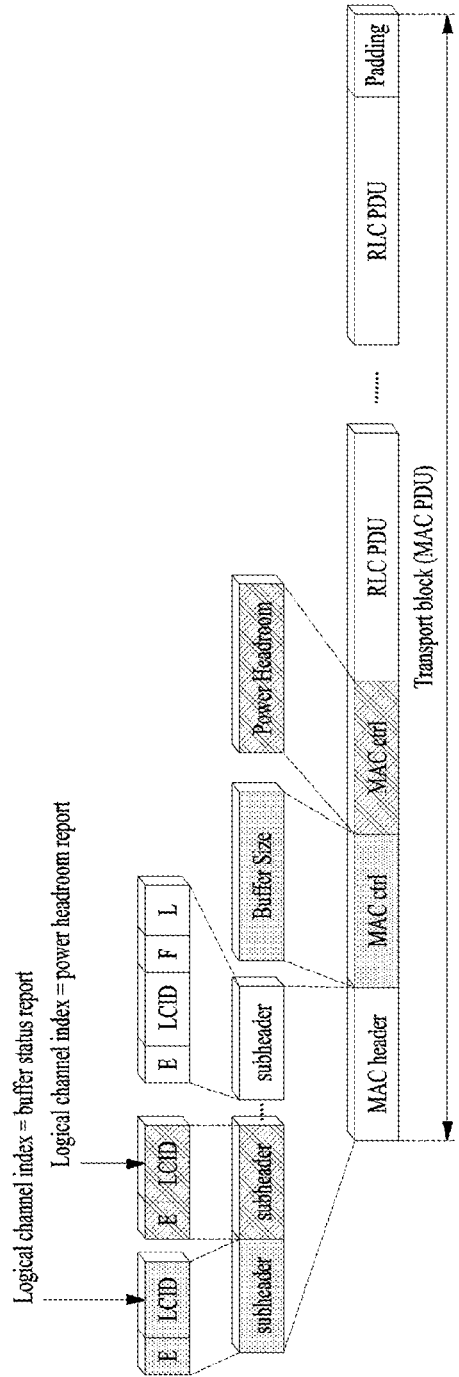
FIG. 10 is a diagram for signaling of buffer status and power-headroom reports.

FIG. 10 is a diagram for signaling of buffer status and power-headroom reports.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 10.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group.

The Buffer Status Reporting (BSR) procedure is used to provide a serving eNB with information about the amount of data available for transmission in the UL buffers of the UE. RRC may control BSR reporting by configuring the two timers periodicBSR-Timer and retxBSR-Timer and by, for each logical channel, optionally signalling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur: i) arrival of data with higher priority than currently in the transmission buffer—that is, data in a logical-channel group with higher priority than the one currently being transmitted—as this may impact the scheduling decision, (i.e., UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR"; retxBSR-Timer expires and the UE has data available for transmission for any of the logical channels which belong to a LCG, in which case the BSR is referred below to as "Regular BSR") ii) change of serving cell, in which case a buffer-status report is useful to provide the new serving cell with information about the situation in the terminal, iii) Periodically as controlled by a timer (i.e., periodicBSR-Timer expires, in which case the BSR is referred below to as "Periodic BSR"), iv) instead of padding. If the amount of padding required to match the scheduled transport block size is larger than a buffer-status report, a buffer-status report is inserted. Clearly it is better to exploit the available payload for useful scheduling information instead of padding if possible (i.e., UL resources are allocated and number of padding bits is equal to or larger than the size of the Buffer Status Report MAC control element plus its subheader, in which case the BSR is referred below to as "Padding BSR").

For Regular BSR, if the BSR is triggered due to data becoming available for transmission for a logical channel for which logicalChannelSR-ProhibitTimer is configured by upper layers, if not running, the MAC entity starts the logicalChannelSR-ProhibitTimer. Else, if running, the MAC entity stops the logicalChannelSR-ProhibitTimer.

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

Else if a Regular BSR has been triggered and logical-ChannelSR-ProhibitTimer is not running, if an uplink grant is not configured or the Regular BSR was not triggered due to data becoming available for transmission for a logical channel for which logical channel SR masking (logical-ChannelSR-Mask) is setup by upper layers, a Scheduling Request shall be triggered.

A MAC PDU may contain at most one MAC BSR control element, even when multiple events trigger a BSR by the time a BSR can be transmitted in which case the Regular BSR and the Periodic BSR shall have precedence over the padding BSR.

The MAC entity may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Introducing asynchronous UL HARQ, one issue is that the UE should receive a new transmission UL grant for the last transmitted data as an acknowledgement. In this case, the UE has to send padding PDU. Considering typical data size of MTC and the number of repetition depending on CE level, this would cause power consumption and resource waste. A mechanism to avoid additional transmission after last data needs to be considered.

Figure 11:
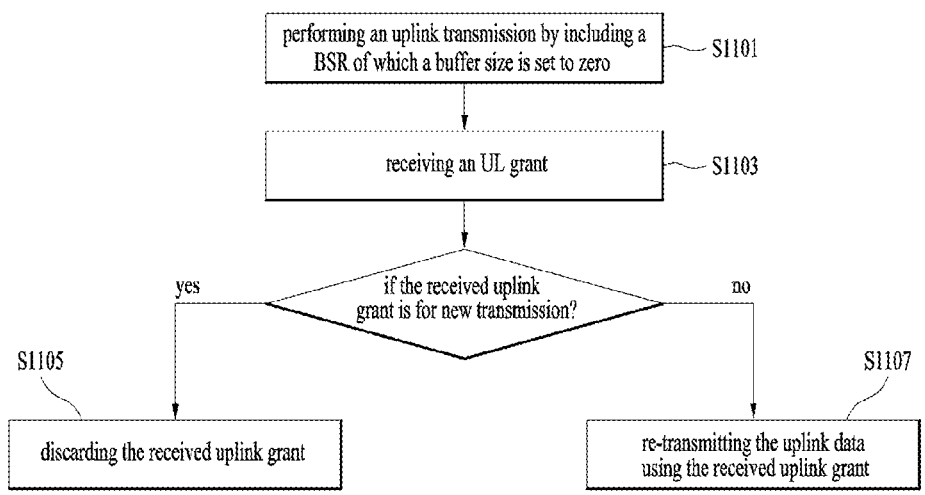
FIG. 11 shows an example for a method of processing an uplink grant after the last uplink transmission in wireless communication system according to embodiments of the present invention.

FIG. 11 shows a method of processing an uplink grant after the last uplink transmission in wireless communication system according to embodiments of the present invention.

It is invented that when an UE receives an UL grant for a new transmission after the UE transmitted a buffer status reporting (BSR) including zero buffer size to an eNB, the UE ignores the received UL grant and does not perform a uplink transmission by using the received UL grant.

An UE performs an uplink transmission by including a BSR (S1101).

When the UE sends the BSR to the eNB, the UE may transmit an UL data along with the BSR, wherein there remains no data available for transmission after the UE performs the uplink transmission to the eNB. In this case, when the UE wants to inform of the data is a last data transmission, a buffer size of the BSR is set to zero.

After the UE performs the uplink transmission, the UE receives an UL grant from the eNB (S1103).

Even though the UE transmits a BSR of which a buffer size is set to zero, when the BS transmits the uplink grant for a new transmission, the UE considers that the uplink transmission which the UE performed lastly before the UE receives the UL grant is successfully transmitted to the eNB. And the UE ignores or discards the received UL grant, and the UE does not generate any MAC PDU for uplink transmission (S1105).

When the UE does not generate any MAC PDU for a uplink transmission, the UE does not generate a MAC PDU even if there is a data available for transmission, or does not generate a MAC PDU including padding bits only even if there is no data available for transmission.

In this case, the UE does not perform any uplink transmission by using the received UL grant. Even if there is a data available for transmission, after the BSR of which the buffer size is set to zero is transmitted, the UE discards the received uplink grant. If there is data available for transmission, the UE performs BSR/SR/RACH procedure as described in TS36.321 after not performing any uplink transmission by using the received UL grant.

Else if the UL grant is for a retransmission, the UE considers that the last uplink transmission which the UE performed before the UE receives the UL grant is not successfully transmitted to the eNB, and the UE performs a retransmission of the last uplink transmission by using the received uplink grant (S1107).

Figure 12:
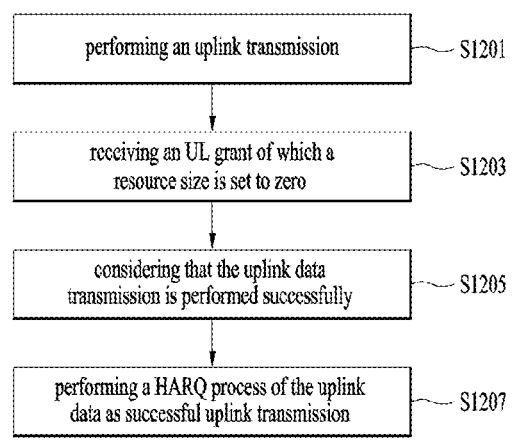
FIG. 12 shows an example for a method of processing an uplink grant of which resource size is set to zero in wireless communication system according to embodiments of the present invention.

FIG. 12 shows a method of processing an uplink grant of which resource size is set to zero in wireless communication system according to embodiments of the present invention.

It is invented that when an UE receives an UL grant of which a resource size is set to zero after transmitting uplink data, the UE ignores the received UL grant and does not perform uplink transmission by using the received UL grant.

After the UE transmits uplink data (S1201), the UE receives uplink grant (S1203).

If the UL grant does not include any scheduling information (i.e., Zero UL grant), the UE considers that the uplink transmission which the UE performed lastly before the UE receives the Zero UL grant is successfully transmitted to the eNB (S1205).

Preferably, the Zero UL grant is a uplink grant: i) of which the transport block size is set to zero, or ii) of which the uplink resource size is set to zero, or iii) indicating that the UL grant does not provide any uplink resource for data transmission.

In this case, the UE performs a HARQ process of the uplink data as successful uplink transmission, so the UE sets a value of HARQ_feedback of the HARQ process to 'ACK'. And the UE ignores the received UL grant, the UE does not generate any MAC PDU for a uplink transmission, and the UE does not perform any uplink transmission.

When the UE does not generate any MAC PDU for a uplink transmission, the UE does not generate a MAC PDU even if there is a data available for transmission, or the UE does not generate a MAC PDU including padding bits only even if there is no data available for transmission.

Preferably, when the UE transmits the uplink data, the UE can transmit a buffer status reporting of which a buffer size is set to zero with the uplink data.

The present invention proposes two ways of avoiding additional transmission after last data needs to be considered. FIG. 11 is a method for not performing additional new transmission using a uplink grant even if the uplink grant is received from the base station when the uplink data transmitted by the UE is the last transmission, and the FIG. 12 illustrates a method in which a UE does not perform additional new transmission when receiving a zero uplink grant from a base station after uplink data transmission of the UE. In this case, when the UE receives a zero uplink grant, the UE interprets that the uplink transmission immediately before the corresponding uplink grant is received is successful.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
   transmitting uplink data with a buffer status reporting (BSR) of which a buffer size is set to zero for indicating that the uplink data is last transmitted data;
   receiving uplink grant for new transmission indicating an acknowledgement (ACK) to the last transmitted data in response to the BSR set to zero, after the BSR is transmitted; and
   discarding the received uplink grant for the new transmission,
   wherein the UE does not perform uplink transmission when the received uplink grant is discarded, and
   wherein when the UE does not perform uplink transmission, the UE does not generate any Medium Access Control Packet Data Unit (MAC PDU) for uplink transmission even if there is a data available for transmission.

2. The method according to claim 1, further comprising:
   re-transmitting the uplink data using the received uplink grant if the received uplink grant is for retransmission.

3. The method according to claim 1, wherein the UE triggers a BSR and a scheduling request (SR) or initiates a random access procedure for the data available for transmission if the UE discards the received uplink grant.

4. A User Equipment (UE) for operating in a wireless communication system, the UE comprising:
   a Radio Frequency (RF) module; and
   a processor operably coupled with the RF module and configured to:
   transmit uplink data with a buffer status reporting (BSR) of which a buffer size is set to zero for indicating that the uplink data is last transmitted data;
   receive uplink grant for new transmission indicating an acknowledgement (ACK) to the last transmitted data in response to the BSR set to zero, after the BSR is transmitted; and
   discard the received uplink grant for the new transmission,
   wherein the received uplink grant is for new transmission,
   wherein the processor does not perform uplink transmission when the received uplink grant is discarded, and
   wherein when the processor does not perform uplink transmission, the UE does not generate any Medium Access Control Packet Data Unit (MAC PDU) for uplink transmission even if there is a data available for transmission.

5. The UE according to claim 4, wherein the processor is further configured to:
   re-transmit the uplink data using the received uplink grant if the received uplink grant is for retransmission.

6. The UE according to claim 4, wherein the processor triggers a BSR and a scheduling request (SR) or initiates a random access procedure for the data available for transmission if the UE discards the received uplink grant.

* * * * *